(12) United States Patent
Carter et al.

(10) Patent No.: US 8,300,117 B2
(45) Date of Patent: Oct. 30, 2012

(54) SYSTEM AND METHOD FOR EXPOSING VIDEO-TAKING HEURISTICS AT POINT OF CAPTURE

(75) Inventors: Scott Carter, Los Altos, CA (US); John Doherty, San Francisco, CA (US); John Adcock, Menlo Park, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 1125 days.

(21) Appl. No.: 12/058,620

(22) Filed: Mar. 28, 2008

(65) Prior Publication Data

US 2009/0244323 A1 Oct. 1, 2009

(51) Int. Cl.
*H04N 5/262* (2006.01)
(52) U.S. Cl. ............. 348/239; 348/208.14; 348/208.15; 348/333.04; 348/169
(58) Field of Classification Search ................. 348/239, 348/208.14, 208.15, 333.04, 169
See application file for complete search history.

(56) References Cited

U.S. PATENT DOCUMENTS

| | | | |
|---|---|---|---|
| 4,901,145 A | 2/1990 | Harradine et al. | |
| 5,204,741 A | 4/1993 | Sakaguchi | |
| 5,471,252 A | 11/1995 | Iu | |
| 5,973,733 A | 10/1999 | Gove | |
| 5,990,865 A | 11/1999 | Gard | |
| 6,278,736 B1 | 8/2001 | De Haan et al. | |
| 6,473,462 B1 | 10/2002 | Chevance et al. | |
| 6,834,249 B2 | 12/2004 | Orchard | |
| 7,280,096 B2 | 10/2007 | Marvit et al. | |
| 7,554,578 B2 * | 6/2009 | Molgaard | 348/231.3 |
| 7,920,161 B2 * | 4/2011 | Niemi et al. | 348/36 |
| 8,081,230 B2 * | 12/2011 | Jiang | 348/222.1 |
| 2002/0057353 A1 * | 5/2002 | Kitsugi et al. | 348/232 |
| 2003/0090572 A1 * | 5/2003 | Belz et al. | 348/207.1 |
| 2003/0122952 A1 * | 7/2003 | Kuroiwa | 348/333.11 |
| 2004/0174434 A1 * | 9/2004 | Walker et al. | 348/211.3 |
| 2004/0179133 A1 * | 9/2004 | Battles et al. | 348/370 |
| 2004/0212699 A1 * | 10/2004 | Molgaard | 348/231.99 |
| 2004/0263635 A1 * | 12/2004 | Katagiri et al. | 348/208.15 |
| 2006/0075448 A1 * | 4/2006 | McAlpine et al. | 725/105 |
| 2006/0082656 A1 * | 4/2006 | Ochiai | 348/207.99 |
| 2006/0170793 A1 * | 8/2006 | Pasquarette et al. | 348/240.99 |
| 2006/0248183 A1 * | 11/2006 | Barton | 709/224 |
| 2006/0280429 A1 * | 12/2006 | Shimosato et al. | 386/52 |

FOREIGN PATENT DOCUMENTS

JP 11088810 A * 3/1999

OTHER PUBLICATIONS

J. Luk, et al., A Role for Haptics in Mobile Interaction: Initial Design Using a Handheld Tactile Display Prototype, CHI, pp. 171-180, 2006.
Jump Cut, http://www.jumpcut.com/, retrieved Jun. 27, 2008.
Apple iMovie, http://www.apple.com/ilife/imovie/, retrieved Jun. 27, 2008.
Nintendo Wii controller, http://wii.nintendo.com/, retrieved Jun. 27, 2008.
J.C. Lee, et al., Haptic Pen: A Tactile Feedback Stylus for Touch Screens, UIST, pp. 291-294, 2004.
Robin Liss, Ten Tips to Better Video, http://www.camcorderinfo.com/content/ten_steps_better_video.htm, retrieved Jun. 27, 2008.
Vincent Soo, Good Video Tips, http://www.camcorderinfo.com/content/good_video_tips.htm, retrieved Jun. 27, 2008.

* cited by examiner

*Primary Examiner* — Usman Khan
(74) *Attorney, Agent, or Firm* — Sughrue Mion, PLLC (57) ABSTRACT

Described is a system and methods for embedding standard video-taking heuristics into video-recording devices to help improve the quality of captured video for consumer devices. The described approach uses a combination of audio, visual, and haptic feedback that responds to video as it is recorded. This feedback can help users compose better shots as well as help them develop an understanding of the fundamentals of good video-taking.

25 Claims, 6 Drawing Sheets

SYSTEM AND METHOD FOR EXPOSING VIDEO-TAKING HEURISTICS AT POINT OF CAPTURE

DESCRIPTION OF THE INVENTION

1. Field of the Invention

This invention generally relates to image and video recording and more specifically to incorporating video-taking heuristics into image and video-recording devices.

2. Description of the Related Art

The integration of video recording into common devices such as digital cameras and cell phones, coupled with the rapid growth of video-sharing web sites, has lowered the threshold for video-work. However, it takes a certain amount of skill to record video that is palatable—ultimately, no amount of editing can save video that is poorly shot.

While there are many post hoc consumer-level video editing tools, such as Jump Cut and Apple iMovie, there are no systems that have attempted to embed user feedback indicative of the design constraints at the point-of-capture of video or still images.

Therefore, unfortunately, conventional image and video recording devices lack the capability of providing a user with feedback that would enable the improvement of the video or still images at the point of their capture.

SUMMARY OF THE INVENTION

The inventive methodology is directed to methods and systems that substantially obviate one or more of the above and other problems associated with conventional techniques for video recording.

In accordance with one aspect of the inventive concept, there is provided a method performed by a camera system. The inventive method involves obtaining parameters of the camera system; determining a composition of a video shot; analyzing the parameters of the camera system and the composition of the video shot; providing a notification to a user, the notification being based on a result of the analyzing and being indicative of a behavior of the user, the behavior having a potential to negatively impact a quality of a video; and recommending a corrective action to the user.

In accordance with another aspect of the inventive concept, there is provided a method performed by a camera system. The inventive method involves obtaining at least one parameter of the camera system or at least one environmental parameter; analyzing the at least one parameter of the camera system or the at least one environmental parameter; and providing a haptic notification to a user, the notification being based on a result of the analyzing.

In accordance with yet another aspect of the inventive concept, there is provided a camera system. The inventive system includes a memory module configured to store parameters of the camera system; a digital imager configured to provide information on a composition of a video shot; an analysis module configured to analyze the parameters of the camera system and the composition of the video shot; and a notification module configured to provide a notification to a user, the notification being based on a result of the analyzing and being indicative of a behavior of the user, the behavior having a potential to negatively impact a quality of a video, the notification module being further operable to recommend a corrective action to the user.

In accordance with a further aspect of the inventive concept, there is provided a camera system. The inventive system includes a memory module configured to store at least one parameter of the camera system or at least one environmental parameter; an analysis module configured to analyze the at least one parameter of the camera system or the at least one environmental parameter; and a notification module configured to provide a haptic notification to a user, the notification being based on a result of the analyzing.

In accordance with yet further aspect of the inventive concept, there is provided a computer readable medium embodying a set of instructions, the set of instructions when executed by one or more processors of a camera system causing the one or more processors to: obtain parameters of the camera system; determine a composition of a video shot; analyze the parameters of the camera system and the composition of the video shot; provide a notification to a user, the notification being based on a result of the analyzing and being indicative of a behavior of the user, the behavior having a potential to negatively impact a quality of a video; and recommend a corrective action to the user.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically:

FIGS. 4(*a*) and 4(*b*) illustrate exemplary embodiments of inventive visual overlays, including the normal viewport (FIG. 4(*a*)) and viewport when camera is panning erratically (FIG. 4(*b*)).

FIGS. 5(*a*) and 5(*b*) illustrate exemplary embodiments of inventive overlays, including a notification the user is talking over the scene (FIG. 5(*a*)) and that a subject may be cut-off (FIG. 5(*b*)).

DETAILED DESCRIPTION

In the following detailed description, reference will be made to the accompanying drawings, in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

An embodiment of the inventive approach uses a combination of sensing as well as haptic and visual feedback to apply video-recording heuristics to help improve the quality of captured video for consumer devices. In accordance with an embodiment of the inventive concept, standard video-taking heuristics are embedded into video-recording devices themselves to help improve source material. An embodiment of the inventive approach uses a combination of haptic, audio and visual feedback that responds to video as it is recorded. As much as this feedback could improve source material, it can also help users understand the fundamentals of good video-taking.

In accordance with one embodiment of the invention system, the feedback is provided to the user in a non-intrusive manner—the guidelines provided to the user interfere as little as possible with recording while still being useful. In accordance with one or more embodiments of the invention, input and analysis capabilities are added to standard camcorders, including motion detection via image analysis or an accelerometer, face detection via image analysis, and directional volume via an additional microphone. Additionally, output capabilities may be also added, including a force feedback mechanism and the ability to overlay graphics on the viewport.

Figure 1:
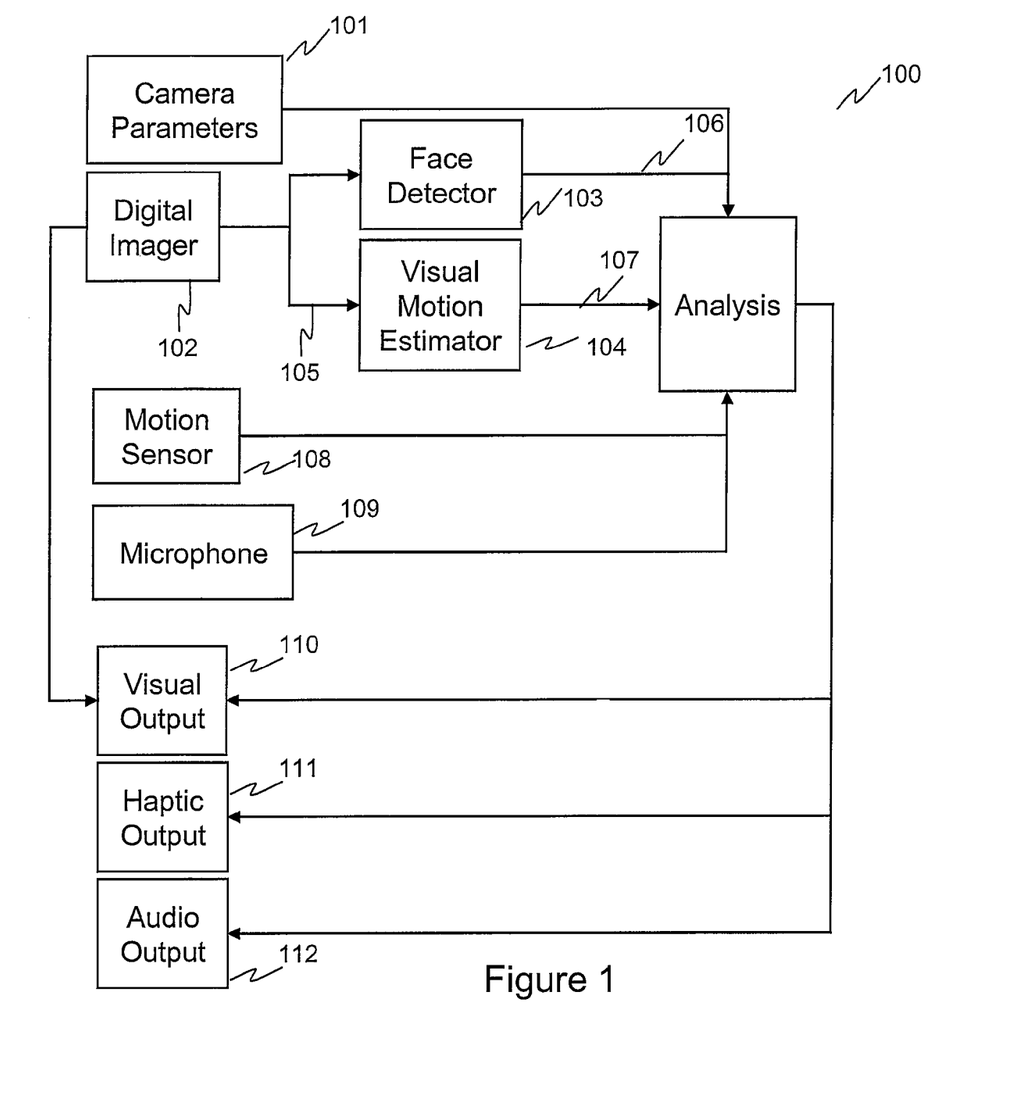
FIG. 1 illustrates an exemplary embodiment of inventive camera feedback system.

FIG. 1 illustrates exemplary embodiment of the inventive system and the flow of the information through it. The inventive system uses information such as camera parameters 101, obtained from a camera control module (not shown). Specifically, camera information is provided from standard camera parameters (shutter speed, aperture, zoom level, and focal distance). The image data 105 generated by the digital imager 102 is provided to a face detection module 103 and visual motion estimator 104. The face detection and motion estimation systems generate information about the positions and sizes of detected faces, and the camera motion respectively. The results of the face detection 106 and the motion data 107 is furnished to the analysis module, along with the camera parameters 101. In addition, the analysis module receives data from the motion sensor 108 and the audio data from the microphone 109. Based on the above input information, the analysis module determines which feedback is appropriate and sends signals to control the camera or provides feedback to the camera operator. Specifically, in an embodiment of the inventive system, the analysis module generated three different types of feedback, including visual feedback 110, which is shown to the user of the camera's viewfinder of display, haptic feedback that is provided to the user by means, for example, of a controlled vibration of the camera, as well as audio output 112.

Figure 2:
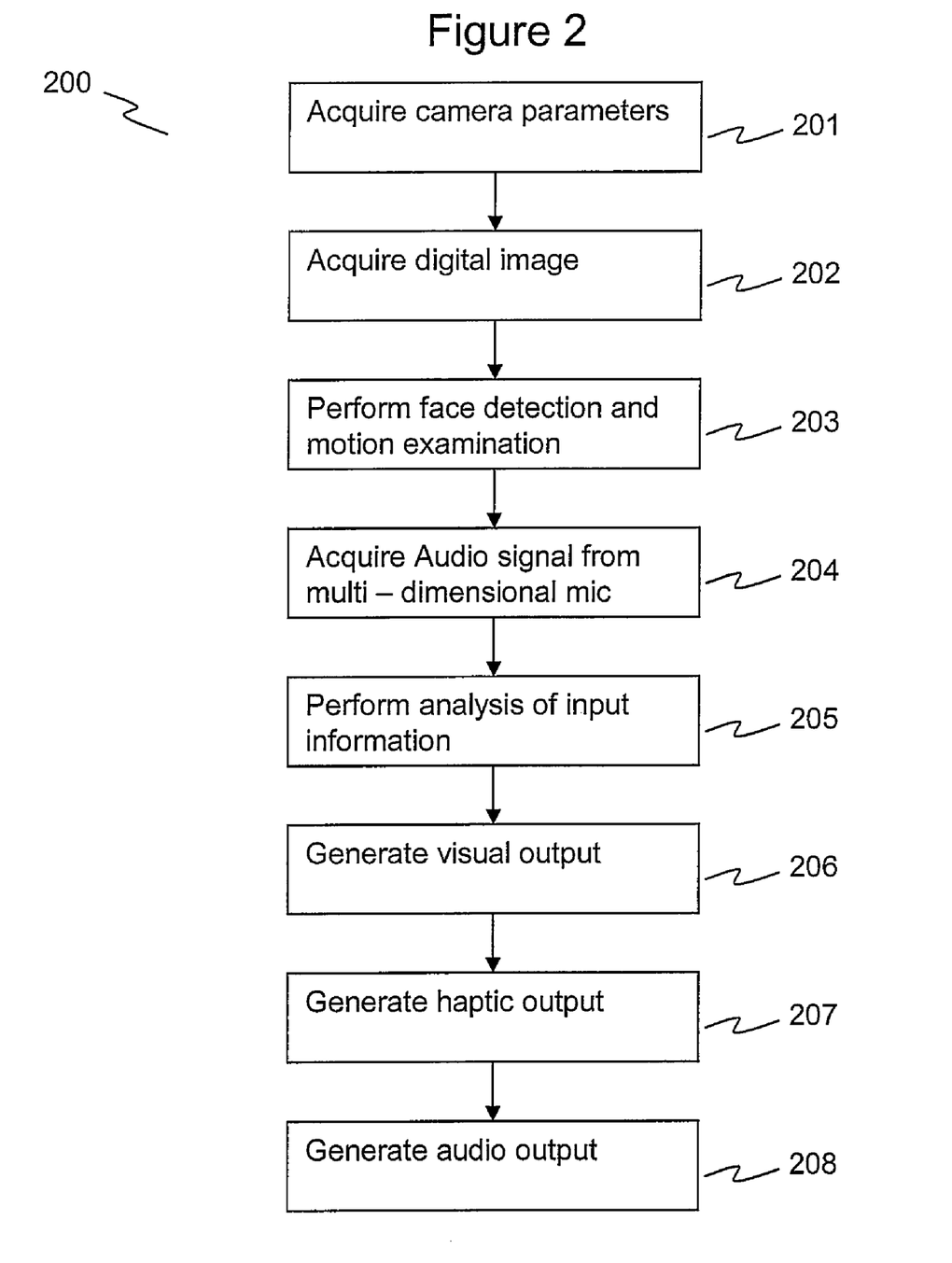
FIG. 2 illustrates an exemplary operational sequence of an embodiment of the inventive system.

FIG. 2 illustrates an exemplary operating sequence of an embodiment of the inventive system. It should be noted that an embodiment of the invention system may perform any of the steps shown in FIG. 2 and those steps may be performed in any sequence. Specifically, at step 201, the camera parameters (shutter speed, aperture, zoom level, and focal distance) are acquired. At step 202, a digital image is acquired using the digital images 102. At step 203, the acquired digital image is used to perform face detection and motion estimation. Additionally or alternatively, the motion estimation may be performed using the output from the motion sensor 108. At step 204, the system acquired audio signal from a multidimensional microphone 109. It should be noted that the aforesaid information acquisition steps may be performed in any appropriate sequence. After acquisition of the aforesaid input parameters, the analysis of the input information is performed at step 205. After that, the visual output, the haptic output and audio output are generated at steps 206, 207 and 208, respectively. After generation, the respective outputs are provided to the user (not shown in FIG. 2).

Various individual components of the system will be described in detail below.

Motion Detection

In one embodiment of the invention, the ability to detect camera motion is achieved by visual analysis of the image captured by the camera itself (digital imager 101). In the same of another embodiment, the same result is achieved through the use of an electronic motion sensor or accelerometer 108.

In case of using the visual analysis to detect camera motion, a variety of systems exist wherein the global motion of a video stream is tracked. Exemplary embodiments of such systems are described in U.S. Pat. No. 5,471,252, U.S. Pat. No. 4,901,145, U.S. Pat. No. 5,204,741, U.S. Pat. No. 5,973,733, U.S. Pat. No. 6,278,736, and U.S. Pat. No. 6,473,462. Widely available digital video stabilization systems, well known to persons of skill in the art, estimate motion from video and stabilize the image by digitally shifting the video frames. Pursuant to this technology, in an embodiment of the invention system, the motion is estimated from the captured video.

An embodiment of the inventive system employs a well know to persons of skill in the art method to achieve motion estimation from captured video, wherein the image is divided into small sub-images and finding of a shifted version of each sub-image is attempted in an ensuing video frame. The resulting set of local motion estimates (one per sub-image) is then posted to determine an estimate of the global motion. The post-processing may include filtering out noisy local motion estimates, taking a mean or median of local estimates to produce a measure of the global motion, low and high-pass filtering of motion estimates over time to separate irregular "shake" motion from more systematic camera movement (panning).

One embodiment of the invention uses an advanced implementation of the visual motion analysis system that may distinguish that certain areas of the frame are stabilized while others are not or have some ability to distinguish background objects from foreground objects. This could be used, for instance, to detect that the center of the frame is stabilized while the borders are not. This might be interpreted to indicate that a moving subject was being tracked and that the system should not warn the user about excessive camera motion.

It should be noted that a visual analysis cannot distinguish between a scene with high motion and a camera that is being rapidly moved. Accordingly, for this reason, another embodiment of the invention employs an accelerometer for motion estimation. It is well-known that compact electronic devices which can sense acceleration are widely available, see U.S. Pat. No. 7,280,096, U.S. Pat. No. 6,834,249, and U.S. Pat. No. 5,990,865. One embodiment of the invention takes advantage an accelerometer to provide feedback to the user based on the motion of the camera without resorting to visual analysis described above. In this embodiment, knowledge of the amount of zoom and/or focal distance of the camera is useful to determine the amount by which the image is being moved in response to camera movement. That is, for example, rotating the camera by a certain amount has a larger effect on the captured image if the scene being captured is at a greater distance from the camera or is under a high degree of zoom.

As would be appreciated by those of skill in the art, because an accelerometer has no information about the content of the scene being captured by the camera, a system employing only an accelerometer cannot differentiate between spurious camera motion and motion that is in fact producing a better result, such as camera motion to maintain a moving in the center of the camera view. Therefore, another embodiment of the invention employs both the accelerometer and image analysis to estimate camera motion.

Audio Input

Video cameras already include one omni-directional microphone to capture audio from the video subject. In accordance with an embodiment of the invention, an additional limited-spectrum directional microphone is added to point at the person controlling the recording. This allows the inventive system to compare the strength of the audio signal from the recorder to that from the scene.

Output

The results of the analysis of the input information are provided as a feedback to the user via haptic, audio, or visual displays. As part of an embodiment of the inventive system, a force feedback mechanism is implemented with a solenoid-based haptic resistor, as described in Lee, J. C. et al., Haptic Pen: A Tactile Feedback Stylus for Touch Screens, UIST '04, Pages 291-294. In another embodiment the feedback is implemented as a haptic-pad, such as described in Luk, J. et al., A Role for Haptics in Mobile Interaction: Initial Design Using a Handheld Tactile Display Prototype, CHI '06, Pages 171-180, or a simple rumble such as implemented in Nintendo Wii controller, well known to persons of skill in the art.

In an embodiment of the invention, the video feedback can be provided within the viewfinder LCD display. In an embodiment of the invention, audio prompts are played through a built-in speaker or through a wired or wireless headset. Audio prompts may take the form of explicit verbal alerts or iconic sound effects. Audio prompts may also be varied proportional to the actions of the camera operator. For instance, a tone prompting that the camera is panning too quickly may rise or fall in pitch as the panning speed increases or decreases.

Scenarios

The components of various embodiments of the inventive system as described above allow handling of various standard problems encountered in video recording, as described in detail below.

Steady Hand

Figure 3:
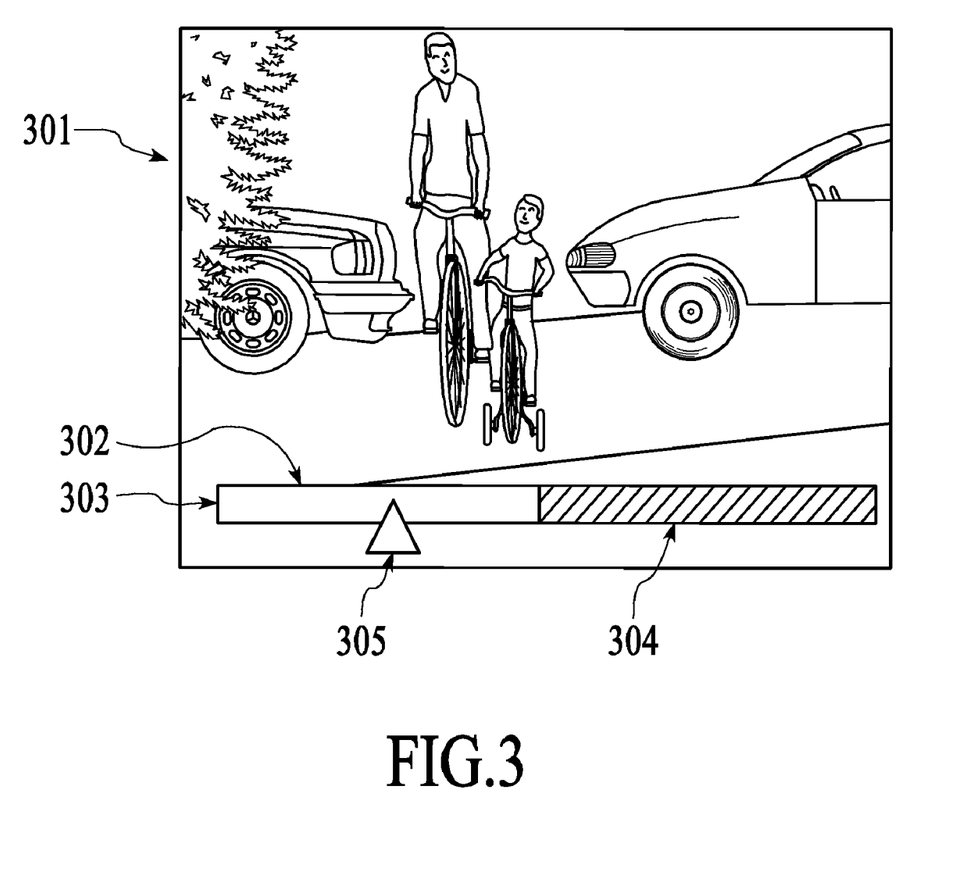
FIG. 3 illustrates an exemplary embodiment of a detailed motion indicator, wherein the current speed is indicated along with target region.

Cameras commonly include an iconic indication of slow shutter speeds. This is to alert the operator that the camera must be held very steady to avoid blurring. What they do not do is inform the operator if he's actually holding the camera sufficiently. In accordance with an embodiment of the invention, the camera automatically measures its motion and provides a positive indication when camera motion is at a minimum and blur-free images are likely and a negative indication when they are not. In one embodiment, this warning takes into account whether any built-in image stabilization system is being overcome by camera shake. In one example the feedback indicates the current amount of camera motion and provides a visual cue showing the ideal amount of camera motion, much like common digital audio level meters provide ongoing feedback for determining appropriate gain for audio recordings. Specifically, an embodiment providing such a feedback is shown in FIG. 3. The feedback is shown to the user on an LCD screen 101. The camera speed bar 102 at the bottom of the LCD screen 101 includes two regions: acceptable region 103 and unacceptable region 104. The current speed indication is also provided, which indicates to the user if he or she needs to take a corrective action.

Erratic Rapid, or Excessive Panning

Figure 4:
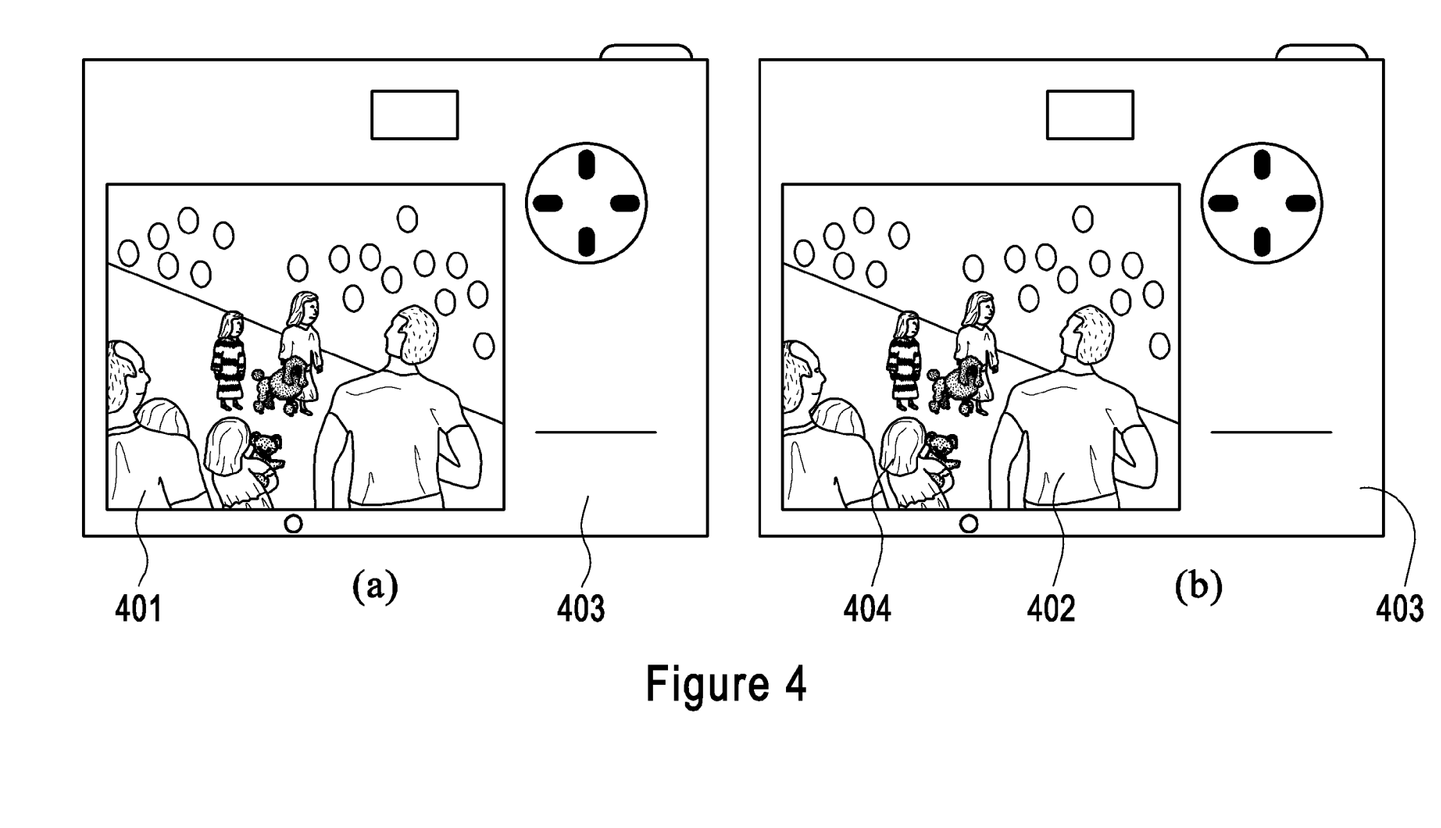

An embodiment of the inventive system may monitor the rate of panning and provide feedback to indicate that it is either too fast or too erratic. Excessive speed is indicated by a high magnitude of global motion, while erratic panning is indicated by frequent changes in panning direction. An embodiment of the inventive system compares the current panning speed to a threshold and if the speed exceeds the aforesaid threshold for a sufficient time, provides feedback to the camera operator, as shown in FIGS. 4(a) and (b). Specifically, FIG. 4(a) illustrates a normal viewport 401. FIG. 4(b) illustrates viewport 404, when camera 403 is panning erratically. The erratic panning of the camera is illustrated by a colored (for example, red) border 402 around the viewport 404.

In a similar way the average change in panning direction and speed over some period of time can be estimated and when it exceeds a threshold appropriate feedback provided to the camera operator. In one example the feedback could indicate the current pan speed and provide a visual cue showing the limits of reasonable panning speeds. To show the acceptable panning speed, an indicator similar to the indicator shown in FIG. 3 is used in an embodiment of the invention.

Because the information on the amount of zooming is also available to the processing unit, over-use of the zoom can be simply detected by maintaining a running average of the zoom used in the last period of time. If the total time or fraction of time spent zooming exceeds a threshold, an embodiment of the inventive system warns the user. In an embodiment of the invention, if the direction of zoom is frequently changed, a different threshold is used to trigger a warning for erratic use of zoom.

In addition to detecting pans that are too fast or too erratic, the inventive camera can also detect if there is simply too much panning being performed. In a similar fashion, the amount of panning or fraction of time spent panning is integrated by an embodiment of the invention over time and compared to a predetermined threshold.

In these situations the appropriate amount of time over which to accumulate statistics may vary, but in general will be on the order of one or two seconds. This may be a configurable parameter of the system, because choosing a longer time period for averaging or being over an acceptable threshold will reduce the amount of feedback provided to the user.

Loss of Subject

Figure 5:
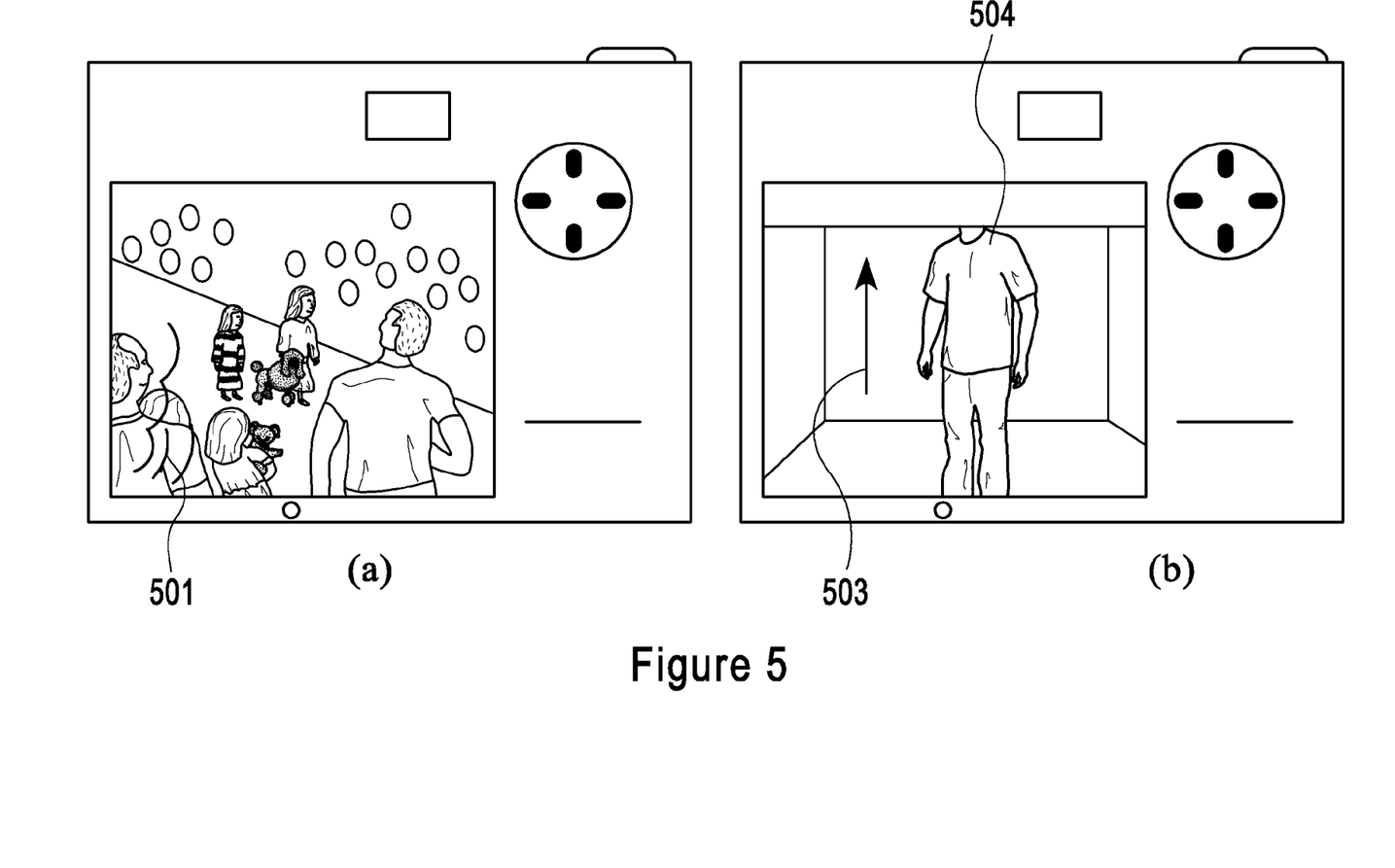

It is becoming common for digital cameras to include real-time face detection capabilities. These capabilities ate typically used for determining high-value points for auto-focus. Given frame-by frame sizes and positions of the detected faces, an embodiment of the inventive system is configured to detect when a previously detected face approaches the boundary and then when it is lost from the frame. Using positional correspondence, faces are tracked over time. As the tracked face approaches the edge of the frame the camera operator is warned by the inventive system that the subject may be soon lost, and when the face exits the frame a different warning informs the camera operator that a subject has been lost. FIG. 5(b) illustrates an exemplary embodiment of a notification (503) to the user that a subject (504) may be cut-off.

In an embodiment of the invention, this information can be combined with motion analysis to differentiate between whether camera motion or subject motion is responsible. If the camera appears to be still, then a face that is exiting the frame is probably due to subject motion, whereas if the camera appears to be moving the loss of the face may be due to the camera operator's actions. In an embodiment of the invention, different user feedback is used for these different situations.

As would be appreciated by persons of skill in the art, a face must be within the camera frame to be detected, thus finding a face which is not completely on the frame is not possible without a different detector or a separate imager.

Irregular Zooming

Users often overuse their zoom feature, and particularly do not realize the severe downgrade in quality that comes with using digital zoom. Therefore, an embodiment of the inventive system provides both visual and haptic feedback to help reduce this tendency. In addition, the same or another embodiment of the inventive system is configured to issue an audible prompt. As would be appreciated by persons of skill in the art, it would be best to ramp the feedback as the zooming increases, with a large increase around the transition to digital zoom.

Cross-Talk

Users have a tendency to talk-over the scene they are recording (cross-talking). When there is no audio in the scene itself this can be a useful narration technique. However, in other cases this can drown-out audio that the user intended to capture. Our system can detect such cross-talk by measuring the loudness of the sound picked up by the rear-facing microphone and provide visual feedback to alert the camera operator that they are speaking over the scene, see FIG. 5(a). In this figure, the user is provided with an indicator 501 indicating that the user is talking over the scene. In case of an attached headset the system may also offer a verbal prompt to the operator.

Genre-Sensitive Templates

Note that the parameters of an embodiment of the inventive system can be adjusted to support genre-specific tasks. For example, a parameter template designed for children's entertainment might encourage more extreme camera motion than one designed for office training videos. Templates may also be altered to suit the desired output medium (e.g., shooting video for YouTube involves different requirements from shooting video for TV).

As would be appreciated by those of skill in the art, the inventive concept of using a combination of sensing as well as haptic and visual feedback to apply video-recording heuristics to help improve the quality of captured video for consumer devices is not limited to the notifications that were specifically described above. As would be appreciated by persons of skill in the art, various other types of feedback may be provided to the user without departing from the spirit and scope of the invention. It should be also noted that the present invention is not limited to video recording or video cameras. The inventive concept of providing the user with a feedback is applicable to still cameras as well.

Exemplary Computer Platform

Figure 6:
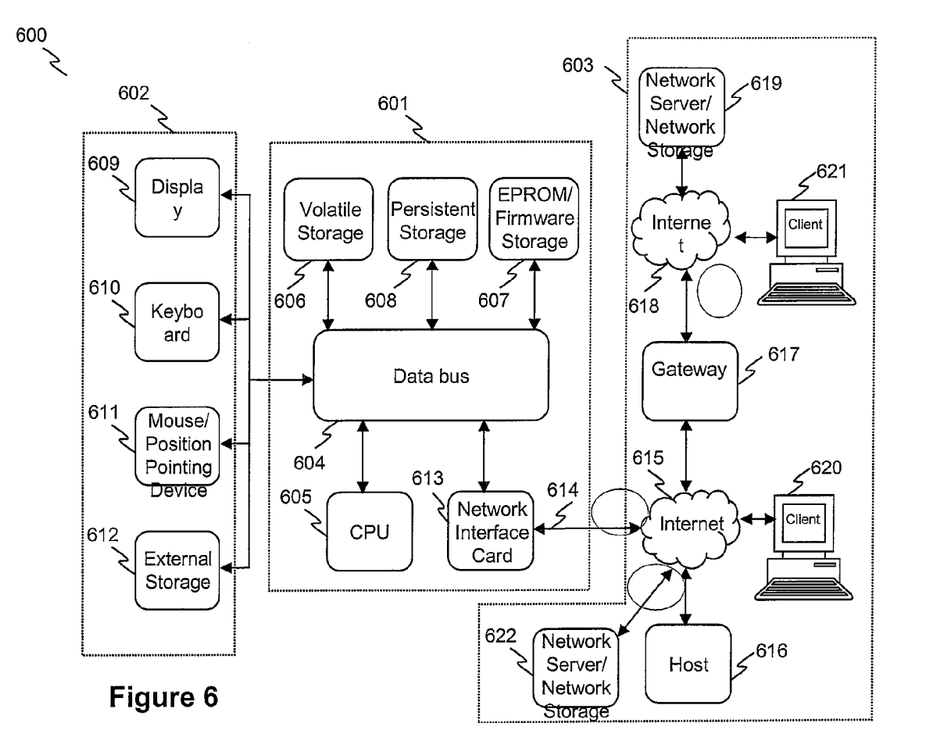
FIG. 6 illustrates an exemplary embodiment of a computer platform upon which the inventive system may be implemented.

FIG. 6 is a block diagram that illustrates an embodiment of a computer/server system 600 upon which an embodiment of the inventive methodology may be implemented. The system 600 includes a computer/server platform 601, peripheral devices 602 and network resources 603.

The computer platform 601 may include a data bus 604 or other communication mechanism for communicating information across and among various parts of the computer platform 601, and a processor 605 coupled with bus 601 for processing information and performing other computational and control tasks. Computer platform 601 also includes a volatile storage 606, such as a random access memory (RAM) or other dynamic storage device, coupled to bus 604 for storing various information as well as instructions to be executed by processor 605. The volatile storage 606 also may be used for storing temporary variables or other intermediate information during execution of instructions by processor 605. Computer platform 601 may further include a read only memory (ROM or EPROM) 607 or other static storage device coupled to bus 604 for storing static information and instructions for processor 605, such as basic input-output system (BIOS), as well as various system configuration parameters. A persistent storage device 608, such as a magnetic disk, optical disk, or solid-state flash memory device is provided and coupled to bus 601 for storing information and instructions.

Computer platform 601 may be coupled via bus 604 to a display 609, such as a cathode ray tube (CRT), plasma display, or a liquid crystal display (LCD), for displaying information to a system administrator or user of the computer platform 601. An input device 610, including alphanumeric and other keys, is coupled to bus 601 for communicating information and command selections to processor 605. Another type of user input device is cursor control device 611, such as a mouse, a trackball, or cursor direction keys for communicating direction information and command selections to processor 604 and for controlling cursor movement on display 609. This input device typically has two degrees of freedom in two axes, a first axis (e.g., x) and a second axis (e.g., y), that allows the device to specify positions in a plane.

An external storage device 612 may be connected to the computer platform 601 via bus 604 to provide an extra or removable storage capacity for the computer platform 601. In an embodiment of the computer system 600, the external removable storage device 612 may be used to facilitate exchange of data with other computer systems.

The invention is related to the use of computer system 600 for implementing the techniques described herein. In an embodiment, the inventive system may reside on a machine such as computer platform 601. According to one embodiment of the invention, the techniques described herein are performed by computer system 600 in response to processor 605 executing one or more sequences of one or more instructions contained in the volatile memory 606. Such instructions may be read into volatile memory 606 from another computer-readable medium, such as persistent storage device 608. Execution of the sequences of instructions contained in the volatile memory 606 causes processor 605 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 605 for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks, such as storage device 608. Volatile media includes dynamic memory, such as volatile storage 606. Transmission media includes coaxial cables, copper wire and fiber optics, including the wires that comprise data bus 604. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, a carrier wave as described hereinafter, or any other medium from which a computer can read.

Various forms of computer readable media may be involved in carrying one or more sequences of one or more instructions to processor 605 for execution. For example, the instructions may initially be carried on a magnetic disk from a remote computer. Alternatively, a remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on the data bus 604. The bus 604 carries the data to the volatile storage 606, from which processor 605 retrieves and executes the instructions. The instructions received by the volatile memory 606 may optionally be stored on persistent storage device 608 either before or after execution by processor 605. The instructions may also be downloaded into the computer platform 601 via Internet using a variety of network data communication protocols well known in the art.

The computer platform 601 also includes a communication interface, such as network interface card 613 coupled to the data bus 604. Communication interface 613 provides a two-way data communication coupling to a network link 614 that is connected to a local network 615. For example, communication interface 613 may be an integrated services digital network (ISDN) card or a modem to provide a data communication connection to a corresponding type of telephone line. As another example, communication interface 613 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 613 sends and receives electrical, electromagnetic or optical signals that carry digital data streams representing various types of information.

Network link 613 typically provides data communication through one or more networks to other network resources. For example, network link 614 may provide a connection through local network 615 to a host computer 616, or a network storage/server 617. Additionally or alternatively, the network link 613 may connect through gateway/firewall 617 to the wide-area or global network 618, such as an Internet. Thus, the computer platform 601 can access network resources located anywhere on the Internet 618, such as a remote network storage/server 619. On the other hand, the computer platform 601 may also be accessed by clients located anywhere on the local area network 615 and/or the Internet 618. The network clients 620 and 621 may themselves be implemented based on the computer platform similar to the platform 601.

Local network 615 and the Internet 618 both use electrical, electromagnetic or optical signals that carry digital data streams. The signals through the various networks and the signals on network link 614 and through communication interface 613, which carry the digital data to and from computer platform 601, are exemplary forms of carrier waves transporting the information.

Computer platform 601 can send messages and receive data, including program code, through the variety of network(s) including Internet 618 and LAN 615, network link 614 and communication interface 613. In the Internet example, when the system 601 acts as a network server, it might transmit a requested code or data for an application program running on client(s) 620 and/or 621 through Internet 618, gateway/firewall 617, local area network 615 and communication interface 613. Similarly, it may receive code from other network resources.

The received code may be executed by processor 605 as it is received, and/or stored in persistent or volatile storage devices 608 and 606, respectively, or other non-volatile storage for later execution. In this manner, computer system 601 may obtain application code in the form of a carrier wave.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, per, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in a system for facilitating high quality video recording. It is intended that the specification and examples be considered as exemplary only, with a true scope and spirit of the invention being indicated by the following claims.

What is claimed is:

1. A method performed by a camera system, the method comprising:
   executing a process, the process performed by the camera system, the process comprising:
   a. Obtaining parameters of the camera system;
   b. Determining a composition of a video shot;
   c. Analyzing the parameters of the camera system and the composition of the video shot;
   d. Providing a notification to a user, the notification being based on a result of the analyzing and being indicative of a behavior of the user, the behavior having a potential to negatively impact a quality of a video; and
   e. Recommending a corrective action to the user in real time, to correctly capture a subject in the video shot, based on the analyzing of the parameters of the camera system and the composition of the video shot;
   wherein the recommending the corrective action to the user is based on a template selected from a plurality of predetermined genre-sensitive templates;
   wherein the video shot is recorded by the camera system in real time; and
   wherein the recommending the corrective action to the user is conducted while the video shot is recorded.

2. The method of claim 1, wherein the analyzing comprises performing face recognition in the video shot and determining whether the subject is about to be lost.

3. The method of claim 1, wherein the parameters of the camera system comprise motion information obtained using a motion sensor and wherein the analyzing comprises performing a motion detection.

4. The method of claim 3, wherein the notification is indicative of an excessive motion of the camera system.

5. The method of claim 1, wherein the analyzing comprises performing a motion detection of the camera system using the video shot.

6. The method of claim 1, wherein the analyzing comprises detecting an irregular zooming of the camera system.

7. The method of claim 1, wherein the parameters of the camera system comprise an audio signal and wherein the analyzing comprises detecting a cross-talk.

8. The method of claim 1, wherein the analyzing comprises detecting and erratic, rapid, or excessive panning.

9. The method of claim 1, wherein the notification to the user comprises a haptic feedback.

10. The method of claim 1, wherein the notification to the user comprises an audio feedback.

11. The method of claim 1, wherein the notification to the user comprises a visual feedback.

12. A method performed by a camera system, the method comprising:
   executing a process, the process performed by the camera system, the process comprising:
      Obtaining at least one parameter of the camera system or at least one environmental parameter;
      Analyzing the at least one parameter of the camera system or the at least one environmental parameter;
      Providing a haptic notification to a user, the notification being based on a result of the analyzing; and
      Recommending a corrective action to the user in real time, to correctly capture a subject in the video shot, based on the analyzing of the parameters of the camera system and the composition of the video shot;
   wherein the recommending the corrective action to the user is based on a template selected from a plurality of predetermined genre-sensitive templates;
   wherein the camera system records a video shot in real time; and
   wherein the recommending the corrective action to the user is conducted while the video shot is recorded.

13. A camera system comprising:
   A memory module operable to store parameters of the camera system;
   A digital imager operable to provide information on a composition of a video shot;
   An analysis module operable to analyze the parameters of the camera system and the composition of the video shot; and
   A notification module operable to provide a notification to a user, the notification being based on a result of the analyzing and being indicative of a behavior of the user, the behavior having a potential to negatively impact a quality of a video, the notification module being further operable to recommend a corrective action to the user in real time, to correctly capture a subject in the video shot, based on the analyzing of the parameters of the camera system and the composition of the video shot;
   wherein the recommending the corrective action to the user is based on a template selected from a plurality of predetermined genre-sensitive templates;
   wherein the video shot is recorded by the camera system in real time; and wherein the recommending the corrective action to the user is conducted while the video shot is recorded.

14. The camera system of claim 13, wherein the analyzing comprises performing face recognition in the video shot and determining whether the subject is about to be lost.

15. The camera system of claim 13, wherein the parameters of the camera system comprise motion information obtained using a motion sensor and wherein the analyzing comprises performing a motion detection.

16. The camera system of claim 15, wherein the notification is indicative of an excessive motion of the camera system.

17. The camera system of claim 13, wherein the analyzing comprises performing a motion detection of the camera system using the video shot.

18. The camera system of claim 13, wherein the analyzing comprises detecting an irregular zooming of the camera system.

19. The camera system of claim 13, wherein the parameters of the camera system comprise an audio signal and wherein the analyzing comprises detecting a cross-talk.

20. The camera system of claim 13, wherein the analyzing comprises detecting and erratic, rapid, or excessive panning.

21. The camera system of claim 13, wherein the notification to the user comprises a haptic feedback.

22. The camera system of claim 13, wherein the notification to the user comprises an audio feedback.

23. The camera system of claim 13, wherein the notification to the user comprises a visual feedback.

24. A camera system comprising:
   A memory module operable to store at least one parameter of the camera system or at least one environmental parameter;
   An analysis module operable to analyze the at least one parameter of the camera system or the at least one environmental parameter;
   A notification module operable to provide a haptic notification to a user, the notification being based on a result of the analyzing; and is operable to recommend a corrective action to the user in real time, for correctly capturing a subject in the video shot, based on the analyzing of the parameters of the camera system and the composition of the video shot;
   wherein the recommending the corrective action to the user is based on a template selected from a plurality of predetermined genre-sensitive templates;
   wherein the camera system records a video shot in real time; and
   wherein the recommending the corrective action to the user is conducted while the video shot is recorded.

25. A non-transitory computer readable medium comprising a set of instructions, the set of instructions when executed by one or more processors of a camera system causing the one or more processors to:
   a. Obtain parameters of the camera system;
   b. Determine a composition of a video shot;
   c. Analyze the parameters of the camera system and the composition of the video shot;
   d. Provide a notification to a user, the notification being based on a result of the analyzing and being indicative of a behavior of the user, the behavior having a potential to negatively impact a quality of a video; and
   e. Recommend a corrective action to the user in real time, to correctly capture a subject in the video shot, based on the analyzing of the parameters of the camera system and the composition of the video shot;

wherein the recommending the corrective action to the user is based on a template selected from a plurality of predetermined genre-sensitive templates;
wherein the video shot is recorded by the camera system in real time; and wherein the recommending the corrective action to the user is conducted while the video shot is recorded.

* * * * *